Sept. 5, 1944. W. C. GREGORY 2,357,399
COMPOSITE GLASS AND CERAMIC ARTICLE AND METHOD OF MAKING
Filed Jan. 13, 1942
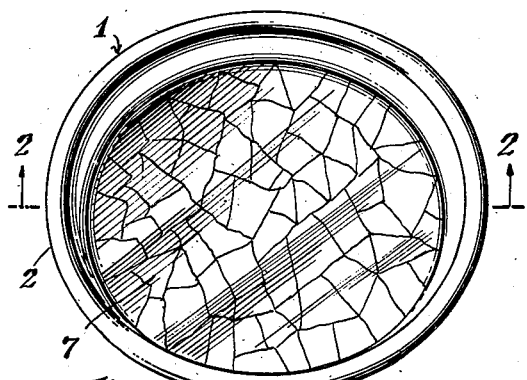
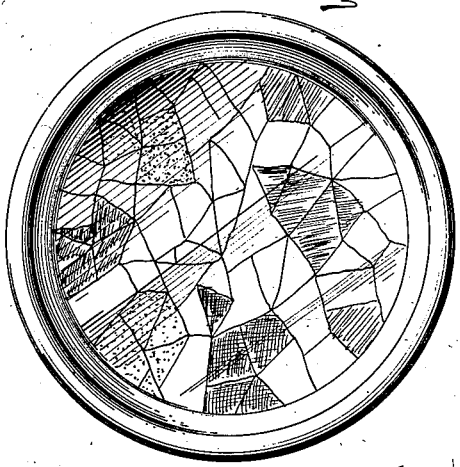
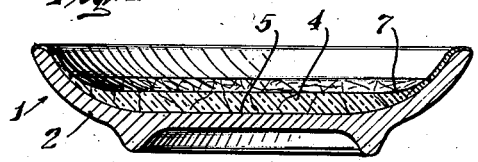
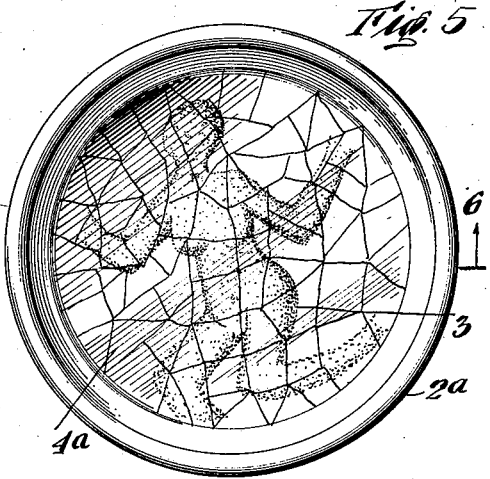
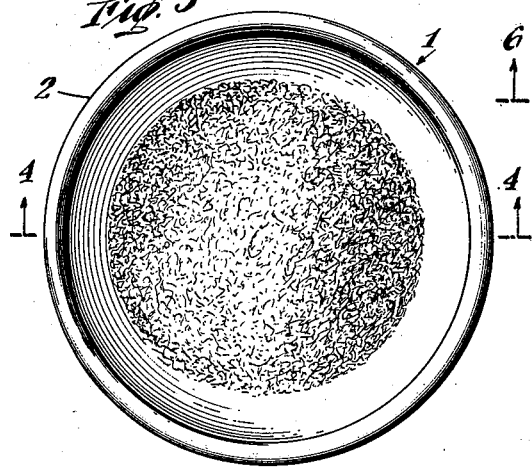
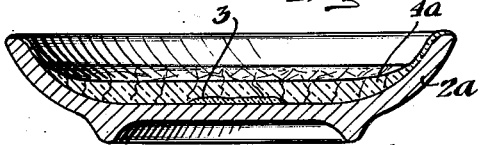
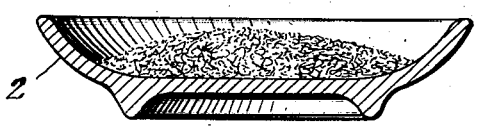
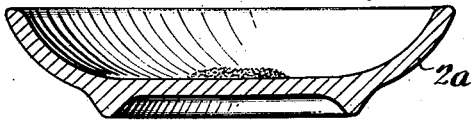
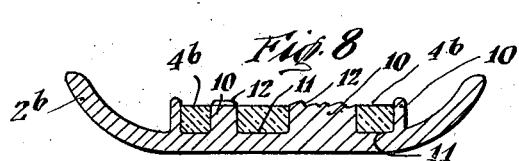
INVENTOR.
Waylande C. Gregory
BY
ATTORNEY Patented Sept. 5, 1944

2,357,399

UNITED STATES PATENT OFFICE 2,357,399

COMPOSITE GLASS AND CERAMIC ARTICLE AND METHOD OF MAKING

Waylande C. Gregory, Bound Brook, N. J.

Application January 13, 1942, Serial No. 426,584

16 Claims. (Cl. 25—156)

This invention relates to the manufacture of composite articles from materials such as glass and clay and like materials.

Artists, sculptors and manufacturers who work with or deal in ceramic products are constantly seeking to discover new products and to obtain new and pleasing decorative effects for their designs. Ceramic products such as pottery, and articles sculptured or otherwise formed from ceramics, have been decorated by painting or glazing them. The difficulty with paint is that it rapidly wears away. The difficulty with glazing is that it adds merely a thin shiny film which contributes little to the decorative appearance of the article.

It is the main object of the present invention aims to provide new and improved composite articles of glass and ceramic materials for instance, the glass portion of the article being of substantially greater thickness than a glaze and being held firmly in position by, or bonded to, a ceramic underbody. The glass which covers an area of the ceramic article is provided with internal fractures functioning as light reflecting facets imparting to the glass covered portion of the article a jewel like quality subject to wide variation. The invention further contemplates the provision of new and improved methods of making said composite articles.

An object of the present invention is to provide new and improved composite glass and ceramic articles.

Another object of the invention is to provide new and improved methods of making composite glass and ceramic articles of the type above described.

Another object of the invention is to provide an article having secured thereto a relatively thick glass covering possessing a jewel-like decorative quality.

Another object of the present invention is to provide such an article incorporating a decorative design underlying the glass.

Other and further objects of the invention will be obvious upon an understanding of the illustrative embodiment hereinafter described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein Fig. 1 is a perspective view of a preferred embodiment of the invention applied to a dish or ash tray;

Fig. 1a illustrates an article similar to that shown in Fig. 1 but having a mottled glass surface;

Fig. 2 is a sectional view taken along the line 2—2 of Fig. 1;

Fig. 3 is a top plan view illustrating one step in the method of making the article shown in Fig. 1;

Fig. 4 is a sectional view taken along the line 4—4 of Fig. 3;

Fig. 5 is a top plan view of an article similar to that shown in Fig. 1 but having a design formed in the thick glass layer;

Fig. 6 is a sectional view taken along the line 6—6 of Fig. 5;

Fig. 7 is a sectional view illustrating one step in the manufacture of the article illustrated in Figs. 5 and 6; and Fig. 8 is a sectional view illustrating the invention embodied in an article having raised and depressed portions.

Referring again to the drawing and more particularly to the Figs. 1 and 2 thereof, there is shown generally an article 1 in the shape of a dish. For purposes of convenience the invention will be described chiefly with reference to such a dish, but it is to be understood that the invention is equally applicable generally to various shapes and kinds of articles including areas of statues and objects of art. The article 1 may comprise a base or body portion 2 made of a suitable ceramic material such as clay, with a relatively thick surface layer of glass 4 or similar material fused to the surface thereof. The layer of glass 4 is provided with internal fractures forming light reflecting facets and may be suitably colored. The coloring may be distributed uniformly throughout the glass layer or may be interspersed to provide a mottled effect (Fig. 1a). The numerous glass faces or facets provided by such finish reflect light at various angles and simulates the reflection of sunlight from the rippled or wave-broken surface of a body of water of the color of the glass.

In the manufactuer of a composite article such as that illustrated in Fig. 1 the first step is to form a design from clay or some other similar material. This may be done in a variety of ways, depending upon the particular shape or type of article desired. For example, if the article is to be a bowl or dish it may be turned on a wheel, cast in a mold, built up by hand, or pressed into shape by machinery. Where the article comprising the clay base is to be such as an architectural bas-relief or a piece of statuary, it will preferably be formed by hand. Numerous kinds or types of clay or ceramic materials may be utilized for the base portion. After the base portion has been formed it is preferably covered with the material for forming the glass layer 4. The glass layer is preferably made by utilizing pulverized glass and spreading it in suitable thickness over an area of the clay article. Thereafter the clay article with the pulverized glass covering may be subjected to heat to fuse the particles of glass together and at the same time cause the resulting layer of glass 4 to fuse or bond to the upper surface of the clay article 2 internal strains being thereafter set up in the glass to cause internal fractures and to form light reflecting facets therein as described above. When cooled the glass will be crackled as illustrated in the drawing. The pulverulent glass may be clear or colored. Many beautiful colors and shades of color may be obtained by mixing clear and colored pulverulent glass in suitable proportions. The use of pulverulent glass to form the layer 4 facilitates manufacture and reduces the cost of articles for it may be prepared by breaking and grinding, or otherwise reducing to a sufficient degree of fineness, glass bottles, jars and other articles of glass which are no longer useful for their original purposes. Unusual and beautiful color effects may be obtained by placing pulverulent glass of different colors at different areas of the surface to be covered and thereafter subjecting the pulverulent glass to heat long enough to fuse together the particles of glass but not long enough to cause the different colors to become completely intermixed with each other. In this way, mottled effects may be obtained.

The glass layer may also be made by mixing and fusing together the raw materials which comprise glass. That is, for example, appropriate portions of silica (as sand) with an alkali (as potash or soda ash) and some other base (as lime or lead oxide). The proportions of the raw materials comprising the glass mixture or batch may be varied so as to produce a glass layer having desired characteristics.

The coloring of the glass may also be accomplished by adding to the pulverized glass or to a mixture of raw materials, or both, relatively small amounts of certain metallic oxides. The coloring obtainable in this way is dependent upon various conditions of mixtures and firing, of which the more important are: (1) the amount of coloring used; (2) the method of admixture; (3) the temperature, and (4) the time during which they are heated. Several tints can be produced with the same metal, the furnace atmosphere also affects the colors produced in the glass.

Some of the coloring oxides are capable of producing several colors, each peculiar to the type of glass mixture and kiln atmosphere. Cobalt oxide usually gives blue colors but in glasses containing much of the oxide of magnesium the color may be red or violet; if fired under strong reducing conditions a black may develop in cobalt mixtures. The oxide of copper may be used as a source of blue and red colors; when fired in an oxidizing kiln atmosphere copper may produce greens unless the alkaline content is high. In highly alkaline mixtures of copper, turquoise blue may be expected. If copper bearing mixtures are submitted to a reducing atmosphere red color may result; Chinese oxblood red is an example. Iron oxide may be utilized to produce tans, browns and reds under oxidizing conditions and will give greens if properly fired in a reducing kiln atmosphere. Colors ranging from browns to purples may be derived from manganese dioxide; the purple color may be increased by increasing the alkalinity of the mixture. In a reducing atmosphere a manganese glass mixture is usually colorless. The oxide of uranium may be used for fluorescent green or yellow.

Preferably oxide of aluminum (alumina) is added to the glass forming batch or mixture as it has been found that this minimizes the formation of undesirable crystalline scum during slow cooling of a composite clay and glass article from a kiln. The aluminum oxide tends to arrest and control the development of crystals in the glass layer 4.

The pulverulent glass or the glass-forming materials or a mixture of both together with colors or color forming materials, i. e. oxides, as described above may be placed in suitable amount on the clay article (Fig. 4) and the article then placed in a kiln and subjected to heat so that the pulverized glass or the glass-forming mixture melts and fuses together with the clay article. The glass materials are placed on the clay article while in a pulverulent finely divided condition and upon being subjected to heat the pulverulent mass fuses together and forms the thick glass layer over the clay article. A sufficient amount of the pulverulent glass mixture should be placed on the clay article to allow for decrease in volume of the mixture during melting together of the particles. Upon being subjected to heat in the kiln for an appropriate time the glass mixture forms a vitreous layer bonded to the clay article, and the clay article becomes permanently baked and hardened. With the above described method the materials (clay and glass or glass-forming materials or both) undergo a single firing in the kiln to fuse them together and, after fusion, causing internal fractures, such as those shown particularly in Figures 2 and 6, these fractures producing light reflecting surfaces or facets in the glass, the thick glass in the finished article being crackled. The thickness of the glass layer 4 is dependent upon the size and type of base to which it is fused and also upon the aesthetic effect desired, but preferably it is from one quarter of an inch to several inches in thickness.

A second method of making the composite article of Fig. 1 is to pre-fire the clay article and the pulverulent glass or glass-forming mixture. That is, each is separately given a partial first firing, then the glass mixture is further heated, and finally the two are placed in contact and fused together in a final firing operation. The partial fusing of the glass forming mixture in the first firing is known as "fritting." After first being partially fused in this manner a portion of the mixture may be pulverized and then the remaining ingredients added. Some of the reasons for utilizing this partial fusing and subsequent pulverizing of the glass are: to render soluble materials insoluble; to change poisonous lead compounds into harmless forms; to minimize blisters and bubbles during fusion; to lower the melting point of the glass mixture, and to produce aesthetic effects.

After being subjected to heat in the kiln for a sufficient length of time the clay article with the melted glass layer thereon may be removed from the kiln and allowed to cool. Preferably, upon fusing of the glass to the base, the conditions, and the properties of the materials, should be such that upon subsequent cooling and shrinking of both materials in the then integrated article, the adhesion between the glass and base, due to the bond between the glass and the ceramic material of the base member, is greater than the cohesion in the glass structure, the rate of contraction or shrinkage of the glass must be greater than that of the base during cooling, i. e. the glass must shrink more than the base, so that because of the above conditions, stresses will be set up in the base to overcome the cohesion in the glass structure and fracture the glass without overcoming the adhesion between the glass and base, that is, without destroying the bond between the glass and base.

The above difference in rates of contraction or of shrinkage should lie within a range wherein the cohesion in the glass structure can be overcome without overcoming the adhesion between the glass and the base member, or the bond therebetween, and within a range wherein a sufficient difference in total shrinkage will occur, upon completion of cooling, to overcome the cohesion in the glass structure and cause the glass to be fractured in haphazard manner. The fractures or fracture surfaces preferably arrange themselves haphazardly, and extend generally depthwise of the glass (Figures 2 and 6). These fracture surfaces function as light reflecting surfaces or facets, imparting jewel-like properties to the glass. The resulting article will be covered with a relatively thick layer of crazed or internally fractured glass having a crackled construction. The thick layer 4 creates an illusion of depth and beauty. Where the layer of glass is formed over a sculptured bas-relief surface the depressions and raised portions of the sculptured surface appear to be viewed through a pool of water.

Instead of coloring the layer 4 uniformly throughout it may be colored only at portions thereof. In this way objects may be represented in or beneath the thick glass layer. For example, in Figs. 5 and 6 a design 3 is illustrated located intermediate the clay dish 2a and thick glass layer 4a. The design 3 may be formed by placing suitably colored glass or glass-forming materials or vitreous clay in desired shape on the clay base member 2a (Fig. 7), then partially baking the dish 2a and design 3, and finally covering the entire design and adjacent areas with clear or suitably colored pulverized glass or glass-forming materials and baking them together and thereafter setting up such strains in the glass as to cause internal fractures as described above to form the finished article. Where the design 3 is in the configuration of a mermaid or fish the figure appears to be swimming beneath the surface of a pool of water. Where coloring materials are interspersed indiscriminately throughout the glass forming mixture (Fig. 1a) a mottled or marble effect will result in the glass layer 4. The design 3 may in some cases be made by placing a metal strip on the clay article and covering it with such a glass layer as described above and herein illustrated. In some instances it may be desired to omit the upper layer of glass and to make only the design 3 on the article of relatively thick vitreous material as described above; in this instance the article 2a and design 3 may be fused together in a single firing operation.

In Fig. 8, the invention is shown with raised portions 10 extending upwardly and with adjacent depressed portions 11. The depressed portions are shown covered with glass 4b and the raised portions are shown extending through the glass layer. The raised and depressed portions may assume any desired pattern and hence produce various artistic effects. If desired, the glass layer 4b may extend over the tops 12 of the raised portions 10. In either case, the top portions 12 may be sculptured. While the above is illustrated applied to a dish or tray 2b, it may have various other applications; for example, it may be utilized in beautifying the bases or other portions of statuary.

It will be seen that the present invention provides a new and improved composite ceramic and glass article embodying aesthetic effects not found in existing articles. The relatively thick glass layer may be of uniform or mottled coloring to promote the illusion of looking into a pool of water, and if desired, designs may be formed in the glass layer to represent fish or the like swimming in the pool. The crackled or internally fractured finish as described above and shown in the drawing still further beautifies the article for the numerous facets reflect light at all angles and may be made to resemble semi-precious jewels, stones and mineral crystals such as topaz, onyx, amethyst and the like. In the following claims, the terms "glass" and "vitreous material" are to be broadly interpreted as including prefired or fritted glass, raw glass or glass forming materials converted to molten glass by the heat of fusion, or mixtures of such fritted glass and raw material or glass forming materials in any suitable proportions, which mixtures will be converted by the heat of fusion to fusible molten glass. This glass will bond to, or fuse with, the ceramic base member and thus become so firmly secured thereto, or integrated therewith that cracking or fracture of the glass may occur upon subsequent cooling of the integrated article without destruction of the bond between the glass and the ceramic material of the base.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. The method of making a composite glass and ceramic article which comprises forming a base member having a cavity therein out of a wet moldable ceramic material, filling said cavity to a substantial depth with a glass-forming material, heating said base member and said material to bake the base member and to form a mass of glass of substantial thickness, fused to the bottom of the cavity and cooling said base member and said glass.

2. The method of making a composite glass and ceramic article which comprises forming a base member having a cavity therein out of a wet moldable ceramic material, filling said cavity to a substantial depth with a glass-forming material having aluminum oxide therein to minimize the crystalline scum formed, heating said base member and said material to bake the base member and to form a mass of glass of substantial thickness, fused to the bottom of the cavity and cooling said base member and said glass.

3. The method of making a composite glass and ceramic article which comprises forming a base member having a cavity therein out of a plastic moldable ceramic material, filling said cavity to a substantial depth with powdered glass, heating said article and said powdered glass to bake the base member and to fuse said glass into a mass of substantial thickness and to fuse said mass to the bottom of the cavity and cooling said base member and said glass.

4. The method of making a composite glass and ceramic article which comprises forming a base member having a cavity therein out of a plastic moldable ceramic material, filling said cavity to a substantial depth with powdered glass, embodying a coloring material in portions of the powdered glass, heating said article and said powdered glass to bake the base member and to fuse said glass into a mass of substantial thickness and to fuse said mass to the bottom of the cavity and cooling said base member and said glass whereby the glass is crackled to reflect light at different angles so that the bottom of the cavity appears to be covered with semi-precious jewels.

5. The method of making a composite glass and ceramic article, which comprises shaping a base member having a cavity therein out of a wet moldable clay, drying said base member, filling said cavity to a substantial depth with pulverulent vitreous material, heating said base member and said pulverulent vitreous material to bake the base member and to fuse said pulverulent vitreous material into a molten mass of substantial thickness and to fuse said mass to the bottom of the cavity and cooling said base member and said molten mass to produce a crazed finish in said fused vitreous material.

6. A composite ceramic and glass article, comprising a fired clay base having a cavity therein and a thick glass layer formed in situ within the cavity and bonded by fusing with the base.

7. A composite ceramic and glass article, comprising a fired clay base having a cavity therein and a thick crazed glass layer formed in situ within the cavity and bonded by fusing with the base.

8. A composite ceramic and glass article comprising a fired ceramic tray, a thick glass layer bonded by fusing to the surface of the base, said layer of glass being cracked depthwise in many directions to give the appearance of numerous semi-precious stones and coloring material beneath the upper surface of said glass layer.

9. A composite ceramic and glass article comprising a ceramic base having thereon a glass layer substantially thicker than a glaze, said glass layer being provided with internal fractures forming light reflecting facets, said layer being bonded by fusing with said base.

10. A composite ceramic and glass article comprising a ceramic base having thereon a glass layer substantially thicker than a glaze, said glass layer being provided with internal fractures forming light reflecting facets, said layer being bonded by fusing with said base, and a design element interposed between said glass layer and said base, said element being visible only through said glass layer.

11. The method of making a composite glass and ceramic article which comprises forming a base member of ceramic material, fusing to said base member a layer of glass material substantially thicker than a glaze and subjecting said glass layer to internal stresses sufficient to cause fracturing of said glass layer internally for forming light reflecting facets therein without destroying the bond between said base member and said internally fractured glass layer.

12. The method of making a composite glass and ceramic article, which comprises forming out of clay or moldable ceramic materials a base member with a cavity therein, filling said cavity to a substantial depth with pulverulent glass material, heating said base member and glass material to partially vitrify the base member and to fuse said glass material into a molten mass of substantial thickness and to fuse said mass to the bottom of the cavity, and cooling said base member and said molten mass to produce haphazardly arranged multiple fractures in said glass material.

13. The method of making a composite glass and ceramic article which comprises forming of ceramic material a base member having a cavity therein, firing said base member, filling said cavity to a substantial depth with glass, firing said base member and glass to bring them at least to the fusion temperature of glass and to fuse the glass to the base member, and cooling said composite article, said glass and said ceramic material having co-efficients of expansion sufficiently different to cause multiple internal fractures of said glass when cooled, without destruction of the bond between the glass and the base.

14. The method of making a composite glass and ceramic article which comprises forming of ceramic material a base member, firing said base member, applying glass to a portion of said base member, firing said base member and glass to bring them both at least to the fusing temperature of glass to fuse the glass with the base member, and cooling said article, said glass and said ceramic material of the base member having co-efficients of expansion sufficiently different to cause internal fracture of said glass when cooled without destruction of the bond between the glass and the base.

15. The method of making a composite glass and ceramic article which comprises forming of unfired ceramic material a base member, placing on said base member sufficient glass to form thereon a layer of substantial depth in the finished article, firing said base member and glass to bring them at least to the temperature of fusion of glass to fuse the glass to the base member, and cooling said integrated glass and ceramic base, said glass and ceramic material having shrinkage rates such that, when cooled, said glass will have shrunk to such greater extent than the ceramic material of said base member that haphazard internal multiple fracture of said glass layer shall have occurred without destruction of the bond between said glass and said base member.

16. The method of making a composite glass and ceramic article which comprises forming of unfired ceramic material a base member with a cavity therein, placing in said cavity at suitable temperature sufficient glass to form a layer of substantial depth in the bottom of said cavity in the finished article, firing said base member and glass to bring it at least to the temperature of the fusion of glass to fuse the glass to the base member, and cooling said integrated glass and ceramic article, said glass and ceramic material having shrinkage rates such that, upon cooling said glass shall shrink at a greater rate than the ceramic material of said base member, whereby haphazard internal multiple fracture of said glass layer shall occur without destruction of the bond between the glass of said layer and the ceramic material of said base member to produce an area comprising glass with internal light reflecting facets, haphazardly arranged.

WAYLANDE C. GREGORY.